United States Patent [19]

Mitsui

[11] 4,358,776
[45] Nov. 9, 1982

[54] THERMAL PRINTER AND IMPROVED PLATEN

[75] Inventor: Yoshihiro Mitsui, Shiojiri, Japan

[73] Assignees: Kabushiki Kaisha Suwa Seikosha, Tokyo; Shinshu Seiki Kabushiki Kaisha, Nagano, both of Japan

[21] Appl. No.: 160,391

[22] Filed: Jun. 17, 1980

[30] Foreign Application Priority Data

Jun. 22, 1979 [JP] Japan ............................. 54-78881
Jun. 22, 1979 [JP] Japan ............................. 54-78882
Jun. 22, 1979 [JP] Japan ............................. 54-78883

[51] Int. Cl.³ ............................................ G01D 15/10
[52] U.S. Cl. ............................................. 346/76 PH
[58] Field of Search .................................. 346/76 PH

[56] References Cited

U.S. PATENT DOCUMENTS

| | | | |
|---|---|---|---|
| 3,631,512 | 12/1971 | Janning | 346/76 PH |
| 3,787,886 | 1/1974 | McCrady | 346/76 PH |
| 3,848,720 | 11/1974 | Carlsen | 346/76 PH X |
| 4,007,352 | 2/1976 | Ura | 346/76 PH X |
| 4,107,700 | 8/1978 | Jornod | 346/76 PH |
| 4,296,309 | 10/1981 | Shinmi et al. | 346/76 PH X |

Primary Examiner—George H. Miller, Jr.
Attorney, Agent, or Firm—Blum, Kaplan, Friedman, Silberman & Beran

[57] ABSTRACT

A thermal printer for printing on a thermal print paper including a platen element of a porous material, a fibrous material or a plastic material having an inrregular surface is provided. The platen element is opposed to the printer heating element which generates thermal energy for printing on the thermal paper. The platen element is mounted in a pair of grooves in a holding member substantially parallel to the printing direction of the heating element and retained therein by an adhesive or compressive retaining members. The inlet and outlet edges of the platen element are rounded for facilitating paper transport thereby.

The elasticity and deformity of the platen element permits intimate contact between the thermal head and the thermal paper for clearer printing with a smaller power input. Repetitive heating and cooling does not result in thermal stresses and extends the life of the thermal head.

22 Claims, 20 Drawing Figures

FIG.3
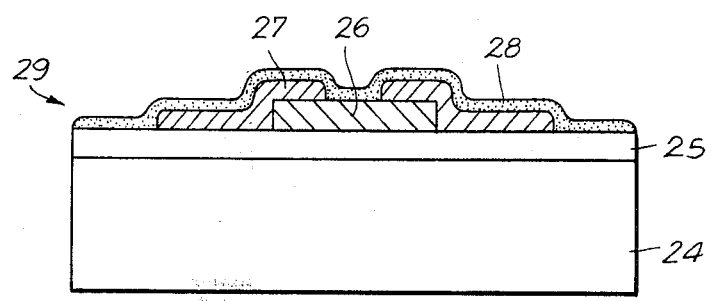
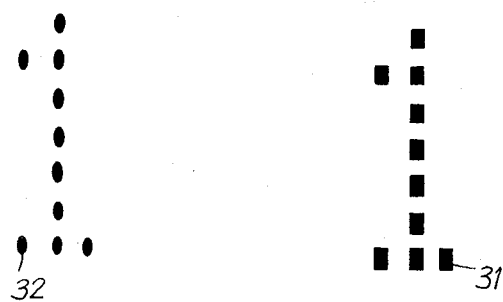
FIG.4(a)    FIG.4(b)

FIG. 9
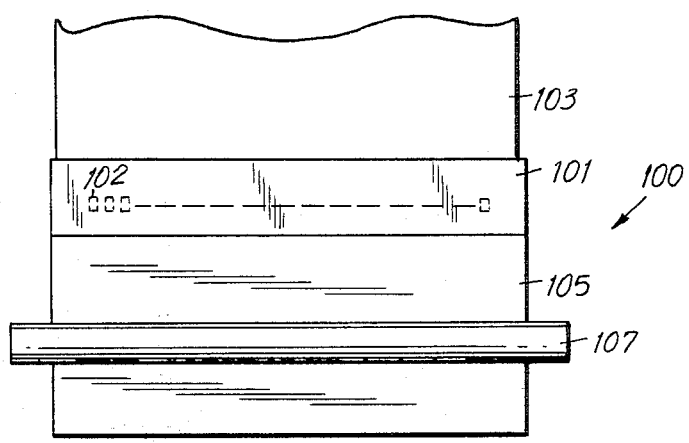
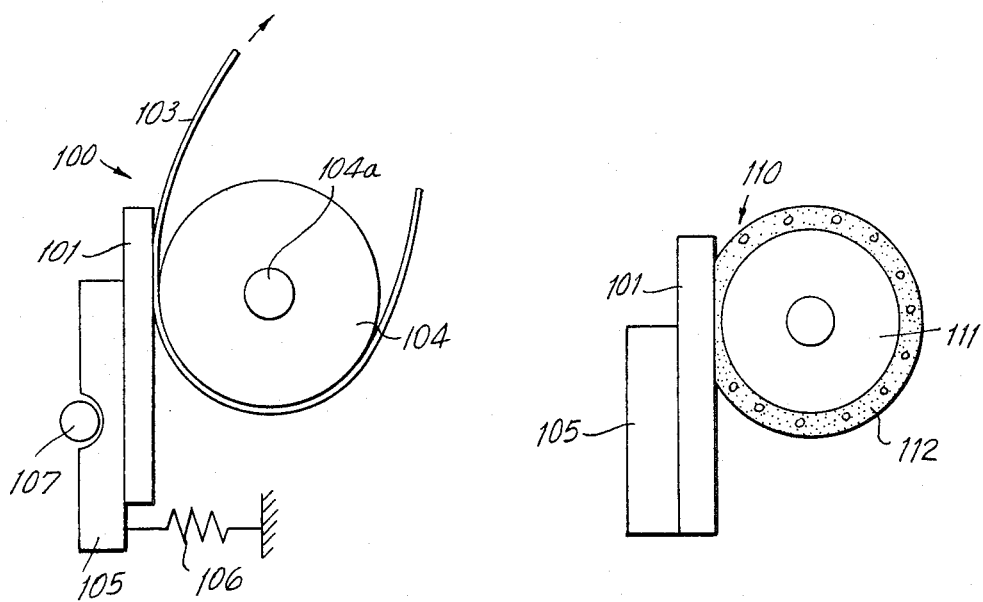
FIG. 10
FIG. 11

FIG. 16(a)
FIG. 16(b)
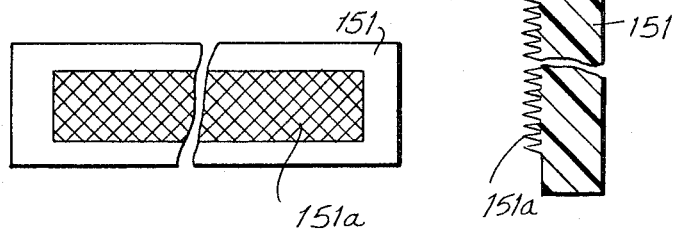
FIG. 17(a)
FIG. 17(b)
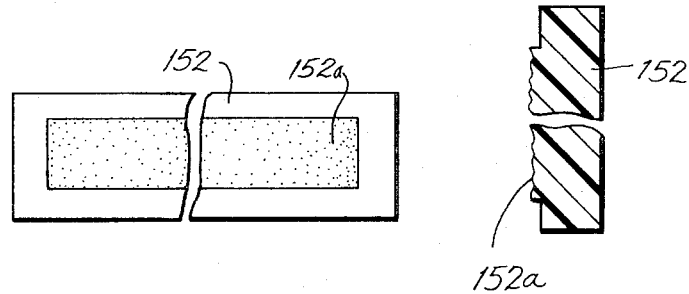

THERMAL PRINTER AND IMPROVED PLATEN

BACKGROUND OF THE INVENTION

This invention relates generally to a printer, and particularly to a thermal printer wherein electrical energy supplied to a heating element for generating thermal energy is applied to a thermally sensitive paper for developing print characters thereon.

Platens in thermal printers have generally been formed from plastic or rubber material. In thermal printers, printing is achieved by positioning a thermal print head next to a thermal print paper against a platen. Columns of characters are printed by displacing the thermal head across paper in a serial printer. Rows of characters are formed by advancing the paper across the thermal print head in a parallel type printer.

In order to be effective, a platen for a thermal printer must satisfy the following requirements. First, the platen must provide consistently good printing quality, and must not impart any shading differences among the letters in a printed line. Second, the platen must reduce friction between the thermal head and the platen surface to permit smooth reciprocal motion of the print head. This is required even if thermal paper is not in position between the print head and the platen surface. Third, the platen surface must not impair the durability of the thermal head or wear of the other mechanical parts of the printer. To date, the conventional unitary practical rubber platens have not satisfactorily fulfilled these requirements. Attempts to overcome the disadvantages have been made, for example by utilizing a platen formed from a relatively soft rubber so that it is more easily deformed. Additional efforts include increasing the force of a compression spring for increasing the pressure of the platen. In addition, attempts have been made to increase the power consumption to the thermal head for darkening the printing for improving uniformity of the print.

Although these methods have succeeded in reducing differences in contrast of the printing, they do not provide a satisfactory solution. Specifically, if the load on the thermal head is increased, this increases the power consumed in order to reciprocate the print head across the print paper. This also results in heavier wear of the protective layer on the thermal head and a reduction in the useful life from the increased pressure. This increased wear tends to generate noise due to the increased friction between the drive shaft and the holder resulting in permanent deformation of a rubber platen.

Accordingly, it is desirable to provide a platen for a thermal printer which overcomes many of these drawbacks and provides a highly durable thermal printer of superior printing quality at low power consumption.

SUMMARY OF THE INVENTION

Generally speaking in accordance with the invention, a thermal printer for printing the characters on a thermal print paper is provided. The thermal printer includes a thermal print head opposed to an improved platen element. The platen element is formed of a porous material, a fibrous material or a plastic material having an irregular printing surface.

The fibrous material is selected from felt, jersey, velvet, corduroy, artificial leather, artificial fur, nonwoven cloth glass cloth and paper. Suitable porous materials include polyurethane form, foam rubber, polyurethane sponge and vinyl foam.

Each of these materials is advantageously utilized in accordance with the invention due to its elasticity and deformability. The fibrous or porous material is retained in a holding member positioned opposed to the thermal print head. The platen element may be mounted in a pair of grooves aligned substantially parallel to the transverse printing direction of the print head. The platen element is retained in the holding member by a region of adhesive or a pair of compressive retaining members retained in the grooves.

The upper and lower leading edges of the platen element are rounded for facilitating paper transport across the platen element.

An improved platen element in accordance with the invention may also be formed of a plastic material having an uneven print surface. The material is sufficiently elastic to provide intimate contact between the heating elements and the thermal paper.

Accordingly, it is an object of the invention to provide an improved thermal printer.

A further ebject of the invention is to provide an improved platen for a thermal printer.

Another object of the invention is to provide a thermal printer including a platen element which provides excellent quality for printing and improves the durability of the thermal head.

Still another object of the invention is to provide a thermal printer having an improved platen element which results in reducing the mechanical load on the thermal printer thereby lowering power consumption in the thermal head.

Still a further object of the invention is to facilitate positional alignment between a thermal print head and a platen element on a thermal printer.

Another object of the invention is to provide a durable platen element for a thermal printer.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a sectional view of a thermal head for a thermal printer;

FIG. 4(a) illustrates the printing of the numeral arabic "1" formed in a dot matrix in abnormal form;

FIG. 4(b) illustrates the numeral arabic "1" in dot matrix in a normally printed form;

FIG. 9 is an elevational view of a thermal printer including an array of heating elements of the parallel type;

FIG. 10 is a side elevational view of the thermal printer illustrated in FIG. 9;

FIG. 11 is a side elevational view of a parallel printer constructed and arranged in accordance with the preferred embodiments of the invention;

FIG. 16(a) is a plan view of a plastic platen for a thermal printer in accordance with the invention;

FIG. 16(b) is a side-sectional view of the platen element in FIG. 16(a);

FIG. 17(a) is a plan view of another plastic platen for a thermal printer in accordance with the invention; and FIG. 17(b) is a side-sectional view of the platen of FIG. 17(a).

DESCRIPTION OF THE PREFERRED EMBODIMENTS

Figure 1:
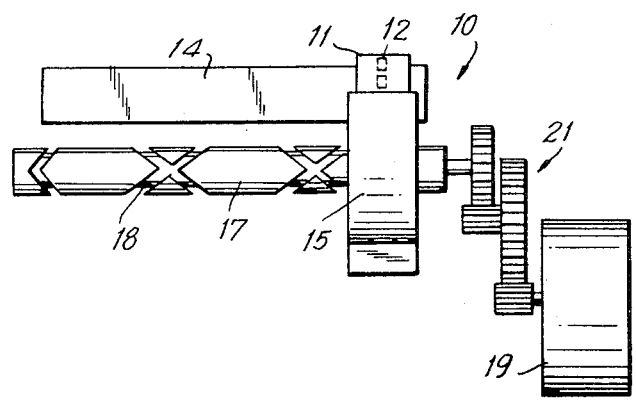
FIG. 1 is a front elevational view of a thermal printer including a conventional platen of the serial type.

Referring now to FIG. 1, a front elevational view of a thermal printer including a conventional platen element is shown generally as 10. Thermal printer 10 includes a thermal print head 11 including a vertical array of heating elements 12 disposed opposed to a platen 14. Thermal printing head 11 is mounted on a holder 15 and a compression spring 16 biases platen 14 in the direction of thermal print head 11.

Figure 2:
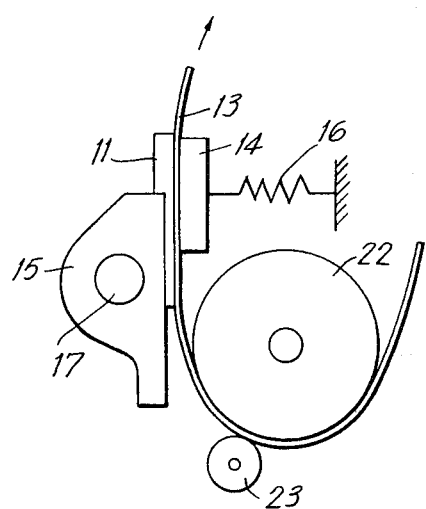
FIG. 2 is a side elevational view of the thermal printer illustrated in FIG. 1.

As shown in the side-elevational view in FIG. 2, a thermal print paper 13 is compressively retained between thermal print head 11 and platen 14. Holder 15 is engaged on a drive shaft 17 formed with a camming groove 18 for specifically positioning thermal print head 11 across thermal print paper 13.

During the printing operation, an electric motor 19 is operated rotating drive shaft 17 through a gear train shown generally as 21 for displacing holder 15 from the right position on shaft 17 to the left position. When an electrical print signal is provided to heating elements 12 by a print control circuit (not shown) characters, such as letters and numerals, arranged in a dot matrix fashion are progressively printed on thermal print paper 13 from one column to an adjacent column. When holder 15 is returned from the left position to the right position on shaft 17, a paper feed roller 22 rotates cooperatively with an auxillary roller 23 for advancing thermal print paper 13 disposed therebetween one printing row.

Conventional platens of the type utilized in the thermal printer of FIGS. 1 and 2 present disparity in printing shades of the characters for several reasons. (1) There is play between holder 15 and drive shaft 17 causing a slight shaking of holder 15 during its reciprocal displacment during printing. This slight shaking prevents continuous intimate contact between thermal print head 11 and thermal print paper 13 during printing. (2) Platen 14 often becomes warped and is not dimensionally stable over varying temperatures. (3) Heating element 12 in thermal print head 11 is recessed inwardly to an extent equal to the thickness of an electrode and tends not to maintain intimate contact with thermal print paper 13. (4) Thermal print paper 13 itself has a certain degree of surface roughness thereby preventing intimate contact with thermal print head 11.

Referring now to FIG. 3, the depressed position of a heating element 26 is clearly shown in the sectional view of a thermal head known generally as 29. Thermal head 29 includes a ceramic body 24 a glass layer 25 which is heat resistant and an electrode 27; electrode 27 and heating element 26 being covered by a protective layer 28. As shown in FIG. 3, heating element 26 is depressed to the extent of the thickness of electrode 27, irrespective of the thickness of heating element 26.

Referring now to FIGS. 4(a) and 4(b), the numeral "1" printed in a dot matrix array is shown. FIG. 4(b) illustrates a normal printed form having excellent contrast whereas the numeral in FIG. 4(a) is abnormal in form. A dot 31 in the numeral in FIG. 4(b) clearly reproduces the shape of a heating element with a suitable degree of darkness. In contrast, a dot 32 in the numeral in FIG. 4(a) is inferior both in shape and in darkness, due most likely to poor contact between the thermal head and the thermal print paper.

Figure 5:
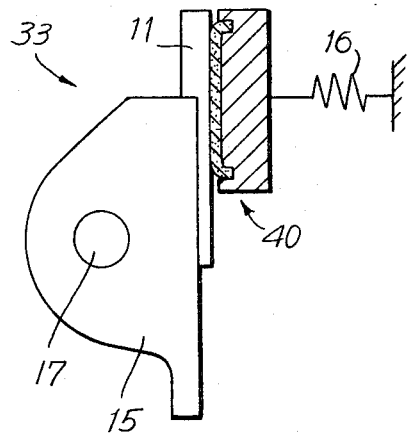
FIG. 5 is a side elevational view of a thermal printer head and platen constructed and arranged in accordance with a preferred embodiment of the invention.

As noted above, previous attempts to improve the thermal printers and overcome the problem illustrated in FIG. 4(a) have been made which have not been totally satisfactory. Referring now to FIG. 5, a side elevational view of a thermal printer constructed and arranged in accordance with a preferred embodiment of the invention is shown generally as 33. Printer 33 includes many of the same elements as the printer illustrated in FIGS. 1 and 2 accordingly like reference numerals have been used for like elements. Printer 33 includes thermal print head 11 mounted on holder 15 which is reciprocally displaced on drive shaft 17 across a platen assembly 40.

Figure 6:
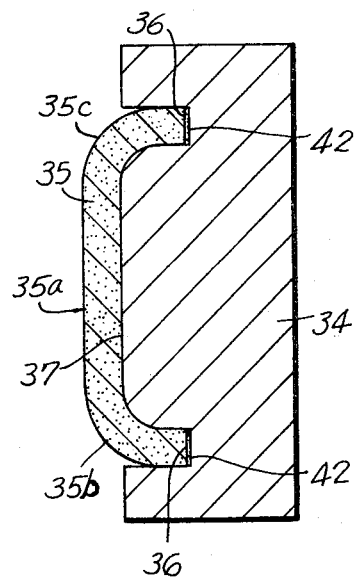
FIG. 6 is a enlarged sectional view of the platen element of the thermal printer illustrated in FIG. 5.

Referring now to FIG. 6, an enlarged sectional view of platen assembly 40 is shown. Platen assembly 40 includes a solid holding member 34 having a bed portion 37 which is disposed opposite to a heating element in thermal print head 11. A platen element of a fibrous material 35 which is elastic and deformable for matching the shape of an object which is brought in contact with it is fixedly mounted to holding member 34 at bed portion 37. Holding member 34 is also formed with a pair of substantially parallel mounting grooves 36 for receiving platen element 35 at its edge for securing platen element 35 to holding member 34. Platen element 35 is secured to holding member 34 by an adhesive 42 shown in each of grooves 36. In this construction, platen element 35 has a leading print surface 35a which remains raised from the plane of holding member 34 facing thermal print head 11. This extension remains even when platen 40 is compressed against thermal print head 11 during printing.

Platen element 35 is formed with a first rounded edge 35b and a second rounded edge 35c corresponding to the inlet and outlet edges of the region between thermal head 11 and platen 40, respectively, for receiving thermal print paper 13 therethrough. This feature of providing rounded edges 35b and 35c facilitates passage of thermal print paper 13 and prevents paper from being impinged in the spaced between thermal print head 11 and platen 40. This configuration also helps reduce friction between platen element 35 and thermal print paper 13 and further protects platen element 35 against excessive wear.

Platen element 35 may be formed of a fibrous material, a porous material or a plastic material having an irregular surface opposed to the thermal head. In the case of a fibrous material, a material may be selected from among felt, jersey, velvet, corduroy, artifical leather, artifical fur, non-woven cloth, glass cloth and paper. When a porous material is selected as the material, satisfactory results have been obtained from polyurethane foam, foam rubber, polyurethane sponge and vinyl foam.

A platen element fabricated from a fibrous or porous material is advantageously utilized in view of the elasticity and deformity of the fibrous or porous material. This permits a platen element to adjust to the shape of an object against which it is compressed. Specifically, a porous material exhibits a substantially linear proportional relationship between compressive load and strain with a high ability to return to its initial shape upon removal of the load. A platen including a platen element formed from such a fibrous or porous material has been found to solve the various problems encountered with conventional platen elements as noted above. Specifically, the lack of intimate contact between the thermal head and the thermal paper due to slight displacement of the thermal head during travel or due to warped or distortion of the platen when it is formed from a plastic material. The additional problem which exists, irrespective of the printing mode of the printer, such as depression of the heating element and the surface roughness of the thermal paper have been solved by providing intimate contact between the thermal paper and the heating elements in the thermal print head.

In accordance with the invention, it is easy to obtain intimate contact between the thermal head and the thermal printer with a smaller amount of compressive force acting upon the paper by appropriately selecting the type, thickness and fiber length of the fibrous material. Similarly, this can be controlled by appropriately selecting a porous material of suitable thickness, bubble size, hardness, density and compressability. In accordance with the invention, the life of the thermal print head, which is generally measured by the linear distance along which it travels and frictional contact with the thermal print paper when the power input to the thermal print head and the pressure to which it is subject are constant, can be prolonged. This is due to the fact that the decrease in pressure necessary to provide the intimate contact between the thermal print head and thermal print paper reduces the wear of protective layer 28 as illustrated in FIG. 3 in print head 29.

By providing intimate contact between the thermal print head and a thermal print paper, sufficient and uniform contrast can be obtained with a smaller power input. In addition to this reduced power consumption, intimate contact permits continuous repetition of heating and cooling without causing any temporary heat storage or substantial thermal stresses forming in the heating element. This prolongs the useful life of the heating elements which is measured by the number of letters which can be printed by a heating element. In addition, decrease of the compressive force on the thermal head also results in a reduction in wear of drive shaft 17 and holder 15 and a reduction in power consumption of motor 19 for moving print head 11 on shaft 17.

Figure 7:
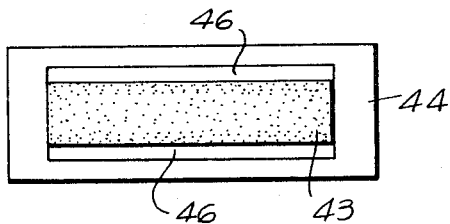
FIG. 7 is a plan view of a platen constructed and arranged in accordance with the invention.
Figure 8:
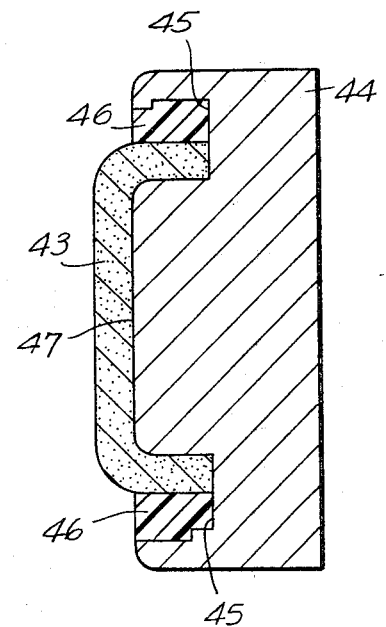
FIG. 8 is an enlarged sectional view of the mid-region of the platen element illustrated in FIG. 7.

Referring now to FIG. 7, a further embodiment of a platen element 43 and holder 44 constructed and arranged in accordance with the invention is shown. An enlarged cross section of the platen of FIG. 7 is shown in FIG. 8. Platen element 43 is and is mounted in two substantially parallel grooves 45 formed in holding member 44. Grooves 45 are formed of a width wider than element 43 for receipt of a pair of compressive retaining members 46 for retaining platen element along a bed portion 47 of holding member 44. In accordance with this embodiment of the invention, a pair of retaining members 46 are utilized but it is possible to use a securing member in the form of a rectangular frame for retaining platen element 43 in holding member 44. A securing member insures the stability of securing the platen element and reduces work necessary to attach the fibrous platen element to the retaining member.

Referring now to FIG. 9, a parallel thermal printer shown generally as 100 utilized for making facsimiles is shown in a plan view. FIG. 10 is a side view of printer 100. Printer 100 includes a thermal head 101 including a horizontal array of heating elements 102. A rubber platen 104 is disposed opposed to heating element 102 with a web of printing paper 103 passing therebetween. Thermal head 101 is supported on a holder member 105 which also serves as a heat releasing member. A compression spring 106 positions thermal print head 101 against platen 104 by biasing thermal print head 101 about shaft 107 which carries holder element 105.

The printing in parallel printer 100 is effected by providing electric power to heating elements 102 at the time thermal paper 103 is moved upwardly between thermal head 101 and platen 104. Printing is generally performed in the dot matrix array for printing numerals, letters, figures, or other like characters. Paper 103 is fed upwardly by rotating platen 104 about a shaft 104a utilizing the friction between thermal paper 103 itself and thermal head 101.

Referring now to FIG. 11, a side elevational view of a parallel printer 110 constructed and arranged in accordance with another embodiment of the invention is shown. The platen of printer 110 includes a layer of porous material 112 encircling a platen core 111. The porous materials found useful are the same as noted above in connection with the embodiments of the invention described in connection with FIGS. 1-6. Accordingly, the porous materials found satisfactory include polyurethane foam, foam rubber, polyurethane sponge and vinyl foam. The porous materials are utilized advantageously by virtue of their elasticity and deformity. Most significant of the advantages obtained in a parallel printer constructed and arranged in accordance with this embodiment of the invention is the ability to maintain intimate contact between thermal print head 101 and a print paper disposed between print head 101 and the platen.

Figure 12:
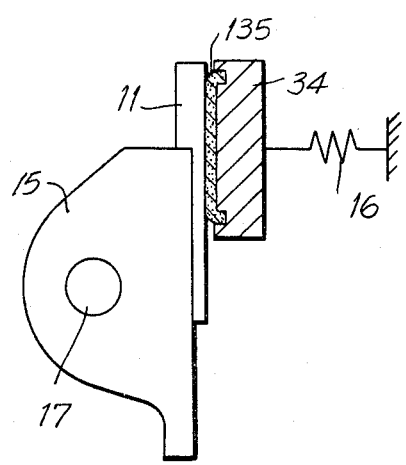
FIG. 12 is a side elevational view of a further preferred embodiment of a serial printer including a thermal print head constructed and arranged in accordance with the invention.
Figure 13:
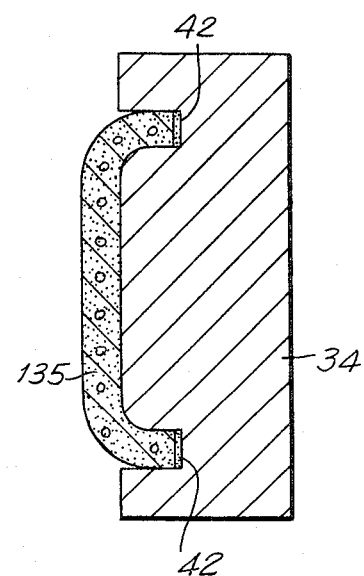
FIG. 13 is an enlarged sectional view of the printer illustrated in FIG. 12.

Turning now to FIGS. 12 and 13, a side elevational view and section of a platen for a serial printer of the type illustrated in FIG. 1 is shown. Like reference numerals are utilized for like elements. In this embodiment of the invention, a platen element 135 of a porous material is illustrated. As in connection with the embodiment of FIGS. 5 and 6 wherein platen element 35 is formed of a fibrous material, platen element 135 formed of a porous material also overcomes the shortcomings of known serial printers. Specifically, a thermal printer including a platen element of a porous material in accordance with this embodiment of the invention overcomes the lack of initimate contact between thermal head 11 and a print paper disposed between thermal head 11 and platen element 135.

As noted above, various materials had been utilized for platen elements in an effort to overcome the shortcomings of the prior art printers. Of these, soft rubber was used to render the platen more easily deformable. This has been found to develop an unevenness in darkness of the characters from one position to another along a particular print line. The pitch of the paper feeding also adversely affects the print quality as the rubber undergoes permanent deformation when left unused. Additionally, an increase in pressure on the platen by raising the force of compression spring 16 results in an increase in power consumption of the motor and a greater wear of protective layer 28 on thermal print head 11. Such an increase load on the mechanical parts results in heavier wear, noise generation and the necessity to increase the rate of paper feeding. These inconveniences manifest themselves more clearly when no thermal paper is pressed in the printer.

Additional efforts to increase the smoothness and thickness of the platen in an effort to reduce distortion has also proved less than satisfactory. These efforts were designed to improve the contact between the thermal head and the thermal paper, due in part to the rough surface of the thermal print paper and the depression of the heating elements within the thermal print head. This results in an increase in the power input to the thermal head is contrary to the developmental trends of printer devices towards smaller units capable of operation under lower power consumption for portable uses.

As noted above, these disadvantages are overcome in accordance with the earlier embodiments of the invention wherein a platen element formed of a fibrous porous material is used. Additionally, in accordance with a further embodiment of the invention, a plastic platen similarly provides printed characters of superior quality with low energy consumption. In accordance with this embodiment of the invention the plastic platen includes irregularly shaped surface facing and in contact with the thermal print paper.

The platen surface may be formed by gathering or squeezing as is in the form of the bristles of a brush.

Referring now to FIGS. 16(a) and 16(b), a plastic platen 151 having an irregular print surface 151 in accordance with this embodiment of the invention is shown in plan view an in an enlarged side view, respectively. Platen element 151 has a print surface 151a which is uneven and the elasticity of platen element 151 is sufficient to permit intimate contact between the heating elements in the thermal printer head and a thermal print paper. Surface 151a is formed as bristles of a brush.

Figure 14:
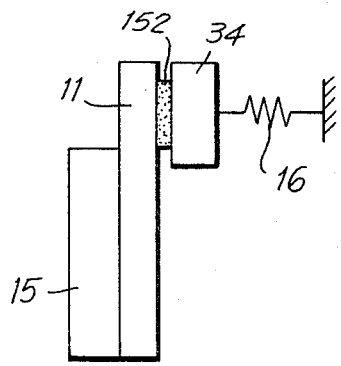
FIG. 14 is a side elevational view of a thermal printer constructed and arranged in accordance with a further preferred embodiment of the invention.
Figure 15:
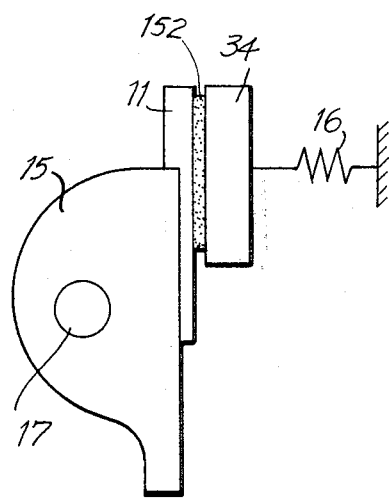
FIG. 15 is a side elevational view of yet another preferred embodiment of a thermal printer constructed and arranged in accordance with the invention.

Referring now to FIGS. 17(a) and 17(b), another plastic plate 152 having a gathered or squeezed print surface 152a is shown in plan and enlarged side views, respectively. Surface 152a of platen 152 which faces the heating element in the print head is formed with the gathered or squeezed surface 152a for holding the thermal paper on a multiplicity of points instead of on a planar surface to effect intimate contact with the heating elements. Platen element 152 of FIG. 17 is shown mounted in a serial printer in FIGS. 14 and 15. Printing is effected in the same manner as described in connection with the earlier embodiment of the invention. Intimate contact between the thermal head and thermal paper is maintained with a smaller amount of force acting upon the paper by selecting the grade and density of the plastic platen, the depth of cavities of surfaces 151a and 152a in the uneven surface and the total surface area of the surfaces 151a and 152a which may be brought into contact with thermal paper against the thermal print head. The life of the thermal head, defined earlier as the distance traveled, is prolonged in view of the decrease in pressure acting on the thermal head which also reduces wear of protective layer 28. This intimate contact at smaller output aids in reducing thermal stresses so that the life of the thermal head is also extended.

The use of platen elements in accordance with the various embodiments of the invention provide satisfactory solutions to the shortcomings of the known serial and parallel thermal printers. The use of a plastic platen element as illustrated in FIGS. 14–17 has provided excellent solutions to the shortcomings of the known serial printers, specifically the lack of intimate contact between the thermal heads and the thermal paper due to the slight shaking of the thermal head during travel, or due to warpage of the platen when formed from plastic material. Similarly, the same results are obtained when the platen element in a serial printer is formed from a fibrous or porous material.

It will thus be seen that the objects set forth above, and those made apparent from the preceding description, are efficiently attained and, since certain changes may be made in the above construction without departing from the spirit and scope of the invention, it is intended that all matters contained in the above description or shown in the accompanying drawings shall be interpreted as illustrative and not in a limiting sense.

It is also to be understood that the following claims are intended to cover all of the generic and specific features of the invention herein describe, and all statements of the scope of the invention which, as a matter of language, might be said to fall therebetween.

What is claimed is:

1. A thermal printer for printing on a thermally sensitive print paper comprising:

thermal print head means including a base having a ceramic body, a glass layer covering said base, at least one heating element disposed on said glass layer for generating thermal energy for printing on a thermal paper, at least one electrode covering said glass layer and heating element and a protective layer of substantially uniform thickness covering said glass layer, heating element and electrode;

a platen disposed in a position opposite to said thermal print head means including a base and a platen element protruding from the surface of said base towards said thermal print head means, said platen element formed of an elastic and deformable material;

bias means for biasing said platen element of said platen against said thermal print head means for pressing thermal print paper in contact with said protective layer on said heating element in said thermal print head means; and print control means for controlling printing by selectively heating said heating element in said thermal print head means for printing on a thermaly sensitive paper disposed between said thermal print head means and said platen.

2. The thermal printer of claim 1, wherein the edges of said platen element transverse to the direction of advancement of the print paper are rounded for facilitating advancement of the print paper.

3. The thermal printer of claim 1 of the parallel printer type wherein the base of the platen is substantially cylindrical and the porous platen element is a layer on the outer surface thereof.

4. The thermal printer of claim 1, wherein said platen element is of a material selected from the group consisting of a porous material, a fibrous material or a plastic material having an irregular surface.

5. The thermal printer of claim 4, wherein the base of said platen is formed with two substantially parallel grooves in a direction transverse to said print paper for receiving the edges of said platen element.

6. The thermal printer of claim 5, wherein the edges of said platen element are retained in said grooves by an adhesive.

7. The thermal printer of claim 5, wherein said grooves are formed wider than the thickness of said platen element and including a pair of elongated resilient mounting members in said grooves for compressively retaining said platen element therein.

8. The thermal printer of claim 4, wherein said platen element is of a fibrous material.

9. The thermal printer of claim 8, wherein said febrous material is selected from the group consisting of felt, jersey, velvet, corduroy, artificial leather, artificial fur, non-woven cloth, glass cloth or paper.

10. The thermal printer of claim 4, wherein said platen element is of a porous material.

11. The thermal printer of claim 10, wherein said porous material is selected from the group consisting of polyurethane foam, foam rubber, polyurethane sponge or vinyl foam.

12. The thermal printer of claim 4, wherein said platen element is of a plastic material having an irregular surface in contact with said print paper.

13. The thermal printer of claims 8, 10 or 12 of the serial printer type thermal print head means including a plurality of heating elements aligned in a row, said thermal print head means selectively displaceable across said print paper and platen for printing in matrix fashion.

14. The thermal printer of claims 8, 10 or 12 of the parallel printer type including thermal print head means having a plurality of thermal elements in a horizontal array for printing characters in matrix fashion on a print paper displaced between said thermal print head and said platen.

15. A platen for a thermal printer including a base and a platen element protruding from the surface of said base, said platen element formed of an elastic and deformable material, selected from the group consisting of a porous material, a fibrous material or a plastic material having an irregular surface, wherein said base is formed with two substantially parallel grooves for receiving the opposed edges of said platen element.

16. The platen of claim 15, wherein said inlet and outlet edges of said platen element are rounded for facilitating print paper advancement thereby.

17. The platen of claim 15, wherein the edges of said platen element are retained in said grooves by an adhesive.

18. The platen of claim 15, wherein said grooves are formed wider than the thickness of said platen element and including a pair of elongated resilient mounting members in said grooves for compressively retaining said platen element therein.

19. The platen of claim 15, of a fibrous material.

20. The platen element of claim 15, of a porous material.

21. The platen element of claim 15 of a plastic material having an irregular surface.

22. The platen element of claim 15, wherein said surface is formed of bristles.

* * * * *